United States Patent [19]

Cobbs, Jr. et al.

[11] 4,162,880

[45] Jul. 31, 1979

[54] PLASTIC SCRAP RECOVERY APPARATUS

[75] Inventors: Walter H. Cobbs, Jr., Amherst; Martin J. Stewart, Strongsville, both of Ohio

[73] Assignee: Nordson Corporation, Amherst, Ohio

[21] Appl. No.: 754,244

[22] Filed: Dec. 27, 1976

[51] Int. Cl.² ............................................. B29B 1/03
[52] U.S. Cl. ..................................... 425/202; 425/215; 425/308; 209/172.5; 222/146 HE; 425/317
[58] Field of Search ............... 425/215, 216, 217, 70, 425/71, 202, 207, 317, 308; 222/146 H; 432/61; 209/3, 172.5

[56] References Cited

U.S. PATENT DOCUMENTS

| 3,263,592 | 8/1966 | Hickey et al. | 425/217 X |
| 3,703,347 | 11/1972 | Hester et al. | 425/202 X |
| 3,733,160 | 5/1973 | Neil | 425/215 X |
| 3,843,060 | 10/1974 | Colburn | 264/37 X |
| 3,964,645 | 6/1976 | Scholl | 222/146 HE |
| 3,969,225 | 7/1976 | Horowitz | 209/127 A |
| 4,036,441 | 7/1977 | Basten et al. | 209/172.5 X |

FOREIGN PATENT DOCUMENTS 50-109975  8/1975  Japan ........................................ 425/217

Primary Examiner—Robert L. Spicer, Jr.
Attorney, Agent, or Firm—Wood, Herron & Evans

[57] ABSTRACT

A scrap recovery system for recovering scrap material from plastic articles such as plastic bottles. The system comprises a hammer mill for breaking the articles into a heterogeneous mixture of chips, a combination separator and sorter for separating the plastic chips from foreign objects and sorting the plastic chips into batches of chips of discrete homogeneous plastic material, a novel melter for melting the batches of homogeneous chips, and a pelletizer for reforming the molten material into solid marketable pellets.

16 Claims, 5 Drawing Figures

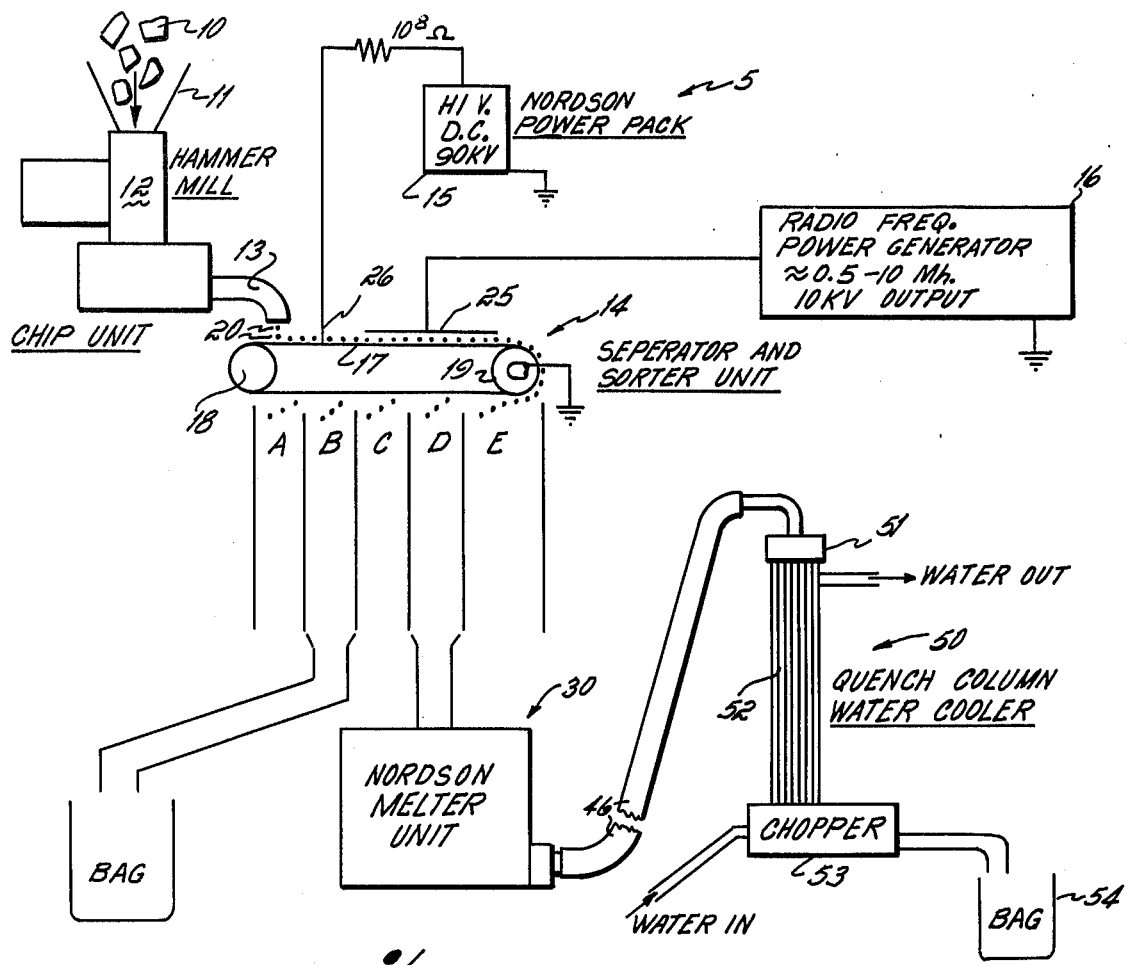
Fig. 1
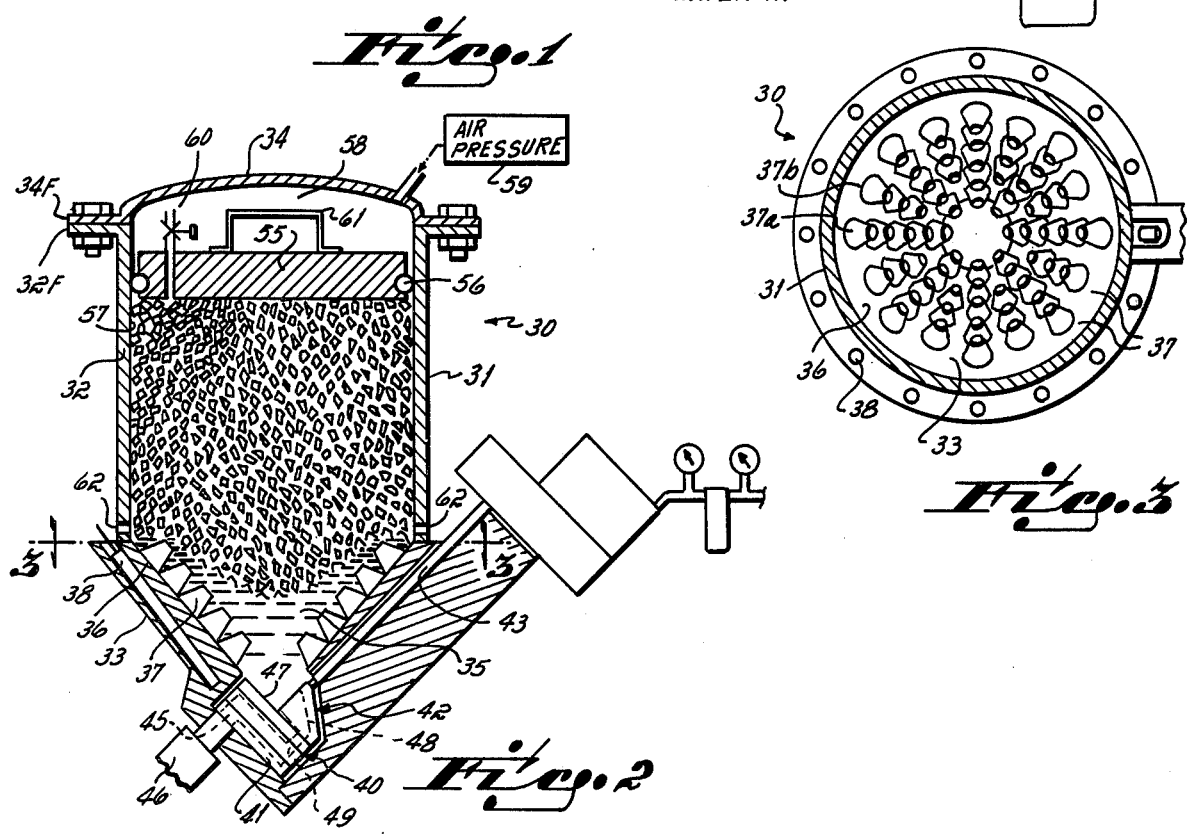
Fig. 2
Fig. 3

PLASTIC SCRAP RECOVERY APPARATUS

This invention relates to a system and method for recovering scrap plastic material from used plastic articles, as for example used plastic bottles or plastic strapping.

To our knowledge, the only plastic scrap recovering being practiced commercially is that of plastic material at production facilities. No attempt is to our knowledge being made to recover plastic from used articles after those articles have outlived their usefulness in the commercial market. That latter recovery is becoming increasingly important though from both an ecological and commercial standpoint as the use of plastic increases.

One new plastic use which has increased the need for a commercially feasible plastic recovery system is the use of plastic in beverage bottles. The beverage companies are now switching from glass and metal containers to plastic bottles, particularly in large size containers. This conversion is creating a large mass of used bottles for which there is no practical recovery. They can now only be destroyed and used for fill.

Another application which is currently generating increased quantities of recyclable or reclaimable plastic is plastic strapping. Past practice has been to close boxes or crates with metal strapping but that metal strapping is now being replaced by plastic strapping. When the boxes or crates are opened, this strapping becomes scrap and of no further use. It is though a potential source of recyclable plastic.

Presently existing scrap recovery systems are impractical for use in the recovery of plastic bottles or used plastic articles for a number of reasons; among them being (1) an inability to generate a sufficiently pure scrap product to have commercial value, (2) an inability to cope with foreign objects and materials in the product to be processed, and (3) requiring such a large capital investment as to dictate too large a throughput to be feasible from a bottle collection and transportation standpoint.

The invention of this application overcomes these shortcomings of prior art processes and apparatus by generating a scrap product of satisfactory quality to have commercial value as a raw material for the production of plastic articles. Specifically, the invention of this application results in the recovery of a scrap product which has very nearly identical physical properties to that of the original plastic from which the scrap was recovered. In practice, the invention of this application results in the recovery of even very high viscosity plastic materials, such as polyethylene terephthalate and acrylonitrile/styrene copolymer (from which plastic bottles are commonly made), without the loss of more than 2% of the intrinsic viscosity of the condensation polymer in the recovery process.

In general, the invention of this application which accomplishes this scrap recovery comprises a hammer mill for breaking the scrap articles, as for example plastic bottles, into plastic chips, a combination separator and sorter for separating foreign objects from the plastic chips and for sorting the heterogeneous mixture of chips into batches of chips of a homogeneous plastic material, a melter for melting the batches of homogeneous chips, and a pelletizer for converting the molten plastic material into a solid saleable form.

The recovery system of this invention comprises relatively inexpensive equipment which is capable of melting and recovering even very viscous plastic materials, as for example materials on the order of 2,000 to 15,000 poise at 500° F., at a high throughput rate. Because the equipment is relatively inexpensive but has a relatively high throughput, it makes practical the recovery of plastic scrap, such as plastic bottles, from a relatively small area or territory from which bottles or used plastic articles can be returned at a minimal transportation cost.

Of the equipment employed in the system, all of it is known and/or commercially available except for the melter. While the melter is described in the application in relation to the recovery of plastic scrap, it should be appreciated that the melter has general utility in the melting of any thermoplastic material in which there is a need for a high throughput of very viscous molten material.

In general, the melter comprises a closed tank having an inverted cone or funnel shaped bottom. Over the inside surface of the funnel there is a grid of upstanding truncated cone shaped protrusions arranged in rows. An electrical resistance heater is located beneath each row of protrusions. The inlet of a gear type pump is located at the bottom of the funnel. The gear type pump is tilted relative to a horizontal plane so as to improve infeed of the viscous molten material into the pump. A piston is sealingly engageable with the inside surface of the tank and is slideable therein. We have found that as little as two pounds of air pressure applied to the top side of this piston often doubles the throughput of viscous molten material through the melter. In the case of plastic materials having a viscosity of 2,000 to 15,000 poise at 500° F., our experience has been that eight pounds of air pressure applied to the top of the piston always increases substantially the throughput of the melter and pump.

The primary advantage of this invention is that it facilitates the recovery of used plastic scrap material and particularly high molecular weight scrap plastic material such as those currently employed in plastic beverage bottles. The melter per se also has the advantage over prior art melters of a much higher throughput of high viscosity thermoplastic material whether in a plastic recovery system or some other application.

These and other advantages of this invention will be more readily apparent from the following description of the drawings in which:

FIG. 1 is a schematic drawing of a plastic scrap recovery system incorporating the invention of this application.

FIG. 2 is a cross-sectional view through the melter section of the system of FIG. 1.

FIG. 3 is a cross-sectional view taken on line 3—3 of FIG. 2.

Figure 4:
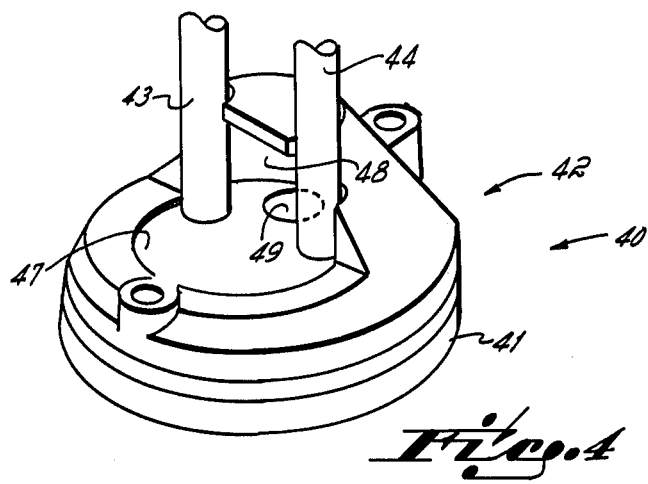
FIG. 4 is an enlarged perspective view of the pump utilized in the melter unit of the system illustrated in FIG. 1.

The scrap recovery system illustrated schematically in FIG. 1 is intended to be utilized in the recovery of plastic from used plastic beverage bottles or other used plastic articles 10. The system is intended to break those articles into small chips, to separate the chips from foreign objects such as bottle caps, etc. and to sort the remaining heterogeneous mixture of chips into discrete batches of a homogeneous type of plastic. Those homogeneous batches of chips are then melted by the recovery system and converted into pellets of a size range in the category of 1 to 3 millimeters on edge. There is a commercial market for such pellets if they are of a purity required by trade practices.

According to the practice of this invention, the bottles or plastic articles 10 are broken into small chips 20 on the order of ¼ inch on a side by a hammer mill 12. In the case of plastic beverage bottles the chips will generally be broken to a size on the order of 0.020 inch in thickness but that dimension is primarily a function of the thickness of the article 10 which is being recycled.

The articles 10 are fed into a hopper 11 which in turn feeds the hammer mill 12. The hopper 11 and hammer mill 12 are conventional commercially purchaseable pieces of equipment which per se form no part of the invention of this application.

From the hammer mill, the chips 20 together with any foreign objects which may have been in the bottles or attached to the bottles or plastic articles 10 are transported by a conventional conveyor, indicated diagrammatically by the numeral 13, to a combination separator and sorter unit indicated generally by the numeral 14. This separator and sorter 14 is operative to separate the plastic chips from foreign objects and to sort different types of particulate plastic materials by subjecting the mixture of materials to a combined applied direct current voltage from a source 15 and to a radio frequency electric field from a source 16, thereby causing the particles to become electrostatically charged and to then become differentially heated in accordance with the respective dielectric constants and loss factors of the various particles. Separation is accomplished as a result of the differential loss of electrostatic charges impressed upon the different types of materials in accordance with their respective physical and chemical characteristics.

The sorter unit 14 comprises a conveyor belt 17 mounted between continuously movable rollers 18 and 19. Belt 17 is made from an electrically conductive material so that it functions as an electrode surface connected to a grounded roll 19.

Particulate chips 20 to be separated and sorted emerge from the conveyor 13 onto the top surface of the moving belt 17. The chips move along the top surface of the belt 17 through an electrostatic field of an electrode 26 and into an RF electric heating field generated by an electrode 25. The electrode 25 is connected to the RF generator 16 and the DC electrode 26 is connected to the DC voltage source 15. In operation, the DC voltage source subjects the chips 20 to an electrostatic charge after which the RF electrical field is operative to heat the chips as they pass beneath the electrode 25.

The effect of the charge applied to the chips 20 by the electrostatic field of the electrode 26 is to adhere those electrostatically charged particles to the belt or conveyor 17. The effect of passage of the particles through the RF electric field is to cause the chips or particles to become heated at varying rates, depending upon the nature of the material. When the particles become heated, they loss their DC charge differentially and concomitantly lose their adherence to the conveyor 17 and fall off into various successive bins A, B, C, D and E in accordance with their intrinsic dielectric characteristics.

In a batch mix of nonconductive dissimilar materials, such as a mixed batch of polyethylene terephthalate and acrylonitrile/styrene copolymer (such as would be expected to be obtained from the breaking of commercially available plastic bottles), each material will give up its charge in a time period proportional to the amount of heat generated within it by the RF electric field. The amount of heat generated by the RF electric field in any material is a function of its chemical and physical structure. Any electrically conductive material present of course is not effected by passage through the electrostatic field of electrode 26. Consequently, as the particles 20 pass over the end roller 19, the electrically conductive materials therein fall off first in a suitable bin E since they will not have been adhered to belt 19 by electrostatic forces. The remaining dielectric plastic materials that pass around roller 19 on belt 17 will, in accordance with their charge loss characteristics fall off the belt into separate spaced bins A, B, C or D depending upon the time required for that particular dielectric material to lose its charge.

The separator and sorter unit 14 per se forms no part of the invention of this application. Such a separator unit is completely described in U.S. Pat. No. 3,969,225 of A. S. Horowitz, issued July 13, 1976. Of course, any separator or sorter may be used in the practice of this invention.

After passage through the separator and sorter unit 14, the separated and sorted discrete batches of homogeneous materials in chip form are contained in one of the bins A, B, C or D. In the illustrated embodiment of FIG. 1, those homogeneous chips from bin D are supplied to the melter unit 30. This melter unit 30 is more completely illustrated in FIGS. 2, 3 and 4.

The melter unit 30 comprises a closed tank 31 having a cylindrical side wall 32, a generally inverted cone shaped or funnel shaped base 33, and a cap 34. The funnel shaped base 33 may be in the form of a frustum of a hollow cone, pyramid or polyhedron. The cap is removably bolted or secured to the top of the side wall 32 by outwardly extending flanges 32f and 34f. The cap is intended to be airtight relative to the tank 31 and accordingly a compressible seal (not shown) may be clamped between the flanges 32f and 34f of the tank cap.

Upstanding from the inside bottom surface 36 of the base 33 are rows of protrusions 37. Each of these protrusions is formed of a heat conductive material and is shaped as a truncated cone. Located beneath each of the rows of protrusions is an electrical resistance heating element 38. This heating element may be inserted in bores in the funnel shaped base 33 or may be cast in the base 33 during fabrication thereof. The heating element is operative to impart heat to the base 36 and subsequently into the protrusions. The protrusions in turn impart heat to the chips or solid material contained within the tank so as to cause that material to melt and form a molten pool 35 of plastic material.

With reference to FIG. 3 it will be seen that alternate rows 37a of the protrusions contain one or more melting units or protrusions 37 than the rows of protrusions 37b spaced between those rows 37a. This differing number of protrusions in alternate rows enables adjacent protrusions to be staggered so that the number of protrusions contained within the base may be maximized.

The truncated cone shaped protrusions have been found to be particularly advantageous in the melting of solid thermoplastic adhesive material and particularly high melting temperature thermoplastic materials such as those from which beverage bottles are commonly made (which have a melting temperature in excess of 350° F.).

Mounted within the bottom of the base 33 there is a gear type pump 40. This pump is completely described and illustrated in U.S. Pat. No. 3,964,645 of Charles H. Scholl, which patent is assigned to the assignee of this application. In general, this pump comprises a base 41 containing a pair of gears (not shown) and a cap 42 mounted over the base. The cap is so shaped that it cooperates with a drive shaft 43 and an idler shaft 44 of the pump to force viscous molten liquid material into the inlet port 49 of the pump. To further assist the input of viscous material into the pump, the pump is tilted approximately 45° to a horizontal plane. This tilting of the pump requires the drive shaft 43 to extend at a 45° angle to a horizontal plane and the top surface of the pump to similarly extend at a 45° angle to a horizontal plane. By tilting the pump to the position shown in FIG. 2, it has been found that the throughput of the pump is markedly increased over that which results from locating the top surface 47 of the pump in a horizontal plane. In this tilted position the recess 48 on the interior of the cap and the sloping top surface 47 of the pump assist gravity flow of the molten material into the inlet port 49.

To further assist the input of viscous material into the inlet port 49 of the pump, there is a piston 55 slidably mounted within the interior of the cylindrical tank 32. This piston has a seal 56 around the periphery which contacts and sealingly engages the interior surface 57 of the cylindrical tank 32. When air pressure is supplied to the chamber 58 above the piston 55 from a source of air pressure 59 the piston 55 is caused to move downwardly with a force which is a function of that air pressure and of the area of the piston. To permit this downward movement of the piston 55, there are small vents 62 in the side wall of the tank 31 spaced just upwardly of the melt level of the plastic material contained within the tank. We have found that as little as two pounds of air pressure applied to the top surface of an eight inch diameter piston can in some instances double the throughput of the pump 40 when the pump is used to pump very viscous materials on the order of 2,000 to 15,000 poise at 500° F.

To facilitate removal of the piston 55 from the tank 31, a valved vent tube 60 extends through the piston, the valve of this vent tube 60 is normally closed but may be manually opened via a stopcock mounted on the tube to permit extraction of the piston by pulling upon a handle 61 secured to the top of the piston.

Figure 5:
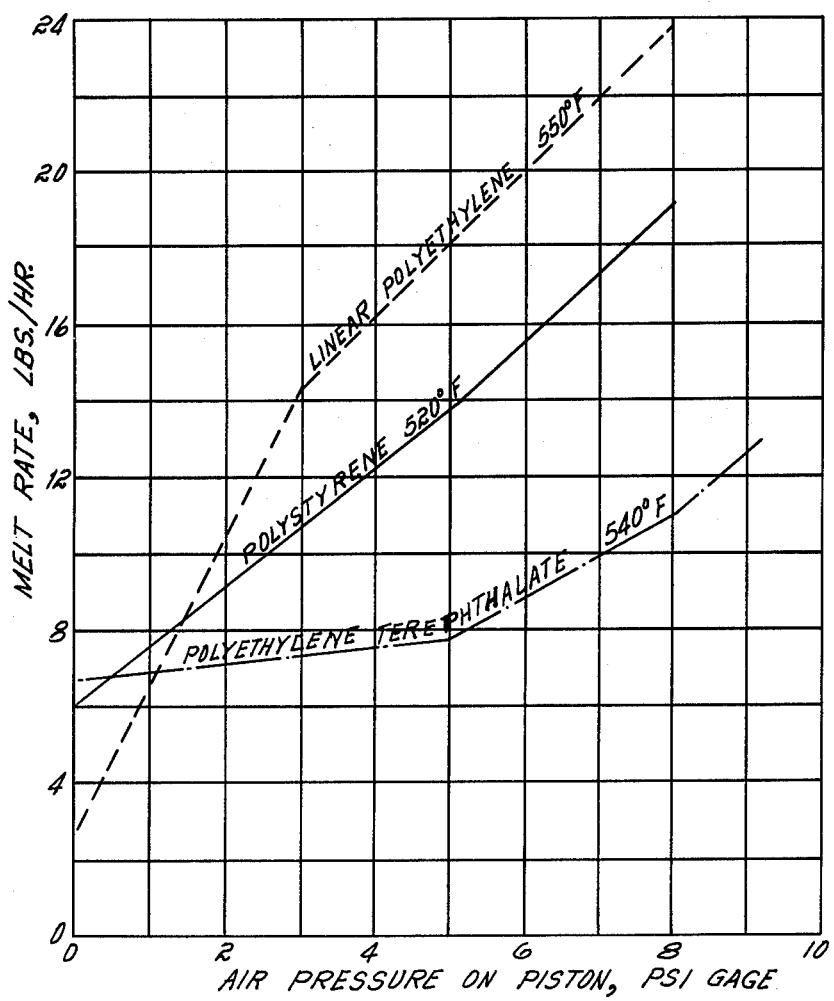
FIG. 5 is a graph illustrating the throughput effect of varying air pressures applied to the top surface of the piston within the melter tank.

With reference to FIG. 5 there is illustrated the variable throughput of the melter 30 including the pump 40 when used to pump polystyrene heated to a temperature of 520° F. and linear polyethylene when heated to a temperature of 550° F. and polyethylene terephthalate heated to 540° F. It will be seen in the case of the polystyrene a pressure of four pounds psi gauge was required to double the throughput of this material. In the case of the linear polyethylene less than one pound of air pressure applied to the top side of the piston more than doubled the throughput of this material.

From the exhaust port 45 of the pump the molten material flows through a heated conduit 46 to a pelletizer 50. The pelletizer 50 per se forms no part of the invention of this application except in combination with the remainder of the total scrap recovery system 5. The pelletizer 50 illustrated diagrammatically in the drawings comprises a conventional shower head type of extrusion die 51 through which the molten material is dispensed in the form of long strings 52 of molten plastic material. The strings or so-called "spaghetti" of molten material are then cooled by a water quench which causes the molten material to be converted to solid strings of thermoplastic material. These solid strings then enter a rotating blade type of chopper 53 which chops the long strings or columns of solid thermoplastic material into small cylinders or squares of approximately 1 to 3 millimeters on a side. From the chopper the material passes into a collection unit such as a collection bag 54.

Rather than a shower head type of die 51, a common slit die may be utilized to form the thermoplastic material into large sheets which can then be chopped by a conventional dicer into small pellets for subsequent feeding into collection bags.

In operation, the plastic articles 10 are fed into the hammer mill 12 which then breaks those articles into small chips of approximately ¼ inch maximum dimension. Those chips are then fed from the hammer mill into the combination separator and sorter. The separator and sorter 14 then separates the nonplastic components from the plastic components and sorts the heterogeneous chips into batches of chips of homogeneous plastic material within each of the bins A, B, C, and D. From the sorter the homogeneous batches are fed one at a time into the melter 30. The melter is then operative to cause the chips to be converted to a molten state in which state the material is supplied to a pelletizer 50. The pelletizer then converts the homogeneous material into small pellets of a size capable of being fed through conventional extrusion equipment used in the manufacture of plastic articles.

While we have described only a single preferred embodiment of our invention, persons skilled in the art to which it pertains will appreciate changes and modifications which may be made without departing from the spirit of our invention. Therefore, we do not intend to be limited except by the scope of the following appended claims.

We claim:

1. A plastic scrap recovery system comprising,
   a hopper for receiving articles containing plastic material to be recovered,
   breaking means for breaking said articles into chips,
   means for separating non-plastic components of said articles from said chips and for sorting heterogeneous mixtures of the chips into batches of discrete homogeneous component plastic materials,
   melting means for melting a selected one of said discrete plastic component materials,
   pelletizing means for converting said melted plastic component material into solid pellets of said plastic component material, and
   means for transporting molten plastic material from said melting means to said pelletizing means.

2. The scrap recovery system of claim 1 wherein said melting means comprises
   a closed tank,
   tank outlet means adjacent the bottom of said tank,
   a piston mounted for sliding movement within the interior of said tank, and
   means for supplying gas at a pressure above that of the atmosphere to the top side of said pistion so as to force said piston downwardly within said tank into contact with said chips and thereby force said chips and molten plastic material toward said tank outlet means.

3. The scrap recovery system of claim 2 wheren said tank outlet means is connected by fluid passageway means to the interior of a pump.

4. The scrap recovery system of claim 3 wherein said pump has an outlet,
said pump outlet being in fluid communication with said pelletizing means whereby molten plastic material forced into said tank outlet means is caused by said pump to flow from said tank outlet means to said pelletizing means.

5. The scrap recovery system of claim 4 wherein said pump is a gear type pump.

6. The scrap recovery system of claim 5 wherein said melting means comprises a grid type melter contained within said tank.

7. The scrap recovery system of claim 6 wherein said grid type melter comprises a matrix of upstanding protrusions, each of said protrusions being shaped as a truncated cone.

8. The scrap recovery system of claim 7 wherein said protrusions are arranged in rows upon a base, the protrusions of one row being offset from the protrusions of the adjacent rows so as to create zig zag channels at the bottom of the rows of protrusions for the flow of molten material from said melting means.

9. The scrap recovery system of claim 8 wherein there is an electrical resistance type of heating element mounted within said base beneath each of said rows of protrusions.

10. The scrap recovery system of claim 9 wherein said truncated cone shaped protrusions are mounted upon a base which is generally funnel shaped.

11. The scrap recovery system of claim 10 wherein the entrance to said gear pump is located at the mouth of said funnel shaped base.

12. The scrap recovery system of claim 1 wherein said melting means comprises a tank and a grid type melter contained within said tank, said grid type melter comprising a generally funnel shaped base and a matrix of upstanding protrusions on said base, each of said protrusions being shaped as a truncated cone.

13. The scrap recovery system of claim 12 wherein said protrusions are arranged in rows upon said base, the protrusions of one row being offset from the protrusions of the adjacent rows so as to create zig zag channels at the bottom of the rows of protrusions for the flow of molten material toward the mouth of said funnel shaped base.

14. The scrap recovery system of claim 13 wherein there is an electrical resistance type of heating element mounted within said base beneath each of said rows of protrusions.

15. The scrap recovery system of claim 14 wherein said molten plastic material transporting means includes a gear pump, the entrance to said gear pump being located at the mouth of said funnel shaped base of said melting means.

16. A plastic scrap recovery system comprising,
a hopper for receiving articles containing plastic material to be recovered,
breaking means for breaking said articles into chips,
means for conveying articles from said hopper into said breaking means,
means for separating non-plastic components of said articles from said chips and for sorting the chips into batches of discrete component plastic materials,
means for conveying chips and non-plastic components from said breaking means to said separating and sorting means,
melting means for melting a selected one of said discrete plastic component materials,
pelletizing means for converting said melted plastic component material into solid pellets of said plastic component material, and
means for transporting molten plastic material from said melting means to said pelletizing means.

* * * * *